United States Patent [19]
Adler et al.

[11] 3,783,568
[45] Jan. 8, 1974

[54] AUTOMOTIVE WINDOW ASSEMBLY AND PROCESS

[75] Inventors: Jürgen Adler; Karl Erck, both of Wolfsburg; Horst Klebba, Weyhausen; Wolfgang Kramer, Ribbesbuttel; Ernst Maneck, Tappenbeck; Hans Mueller-Eckhardt; Kurt Schwenk, both of Wolfsburg, all of Germany

[73] Assignee: Volkswagenwerk Akt, Wolfsburg, Germany

[22] Filed: May 21, 1971

[21] Appl. No.: 145,764

[30] Foreign Application Priority Data
May 21, 1970 Germany.............. P 20 24 753.4

[52] U.S. Cl................. 52/400, 52/400, 29/469, 296/84
[51] Int. Cl.............................................. B60j 1/00
[58] Field of Search................... 52/400, 393, 397, 52/403, 498, 502, 494, 499, 741, 616; 296/84; 49/476, 488; 29/469

[56] References Cited
UNITED STATES PATENTS

| | | | |
|---|---|---|---|
| 2,378,031 | 6/1945 | Paddock | 52/616 X |
| 2,249,547 | 9/1939 | Balfe | 296/84 R |
| 2,733,789 | 2/1956 | Tolle | 52/499 X |

FOREIGN PATENTS OR APPLICATIONS

| | | | |
|---|---|---|---|
| 973,813 | /1964 | Great Britain | 52/499 |
| 1,394,484 | /1965 | France | 52/400 |
| 705,945 | /1954 | Great Britain | 52/397 |
| 1,801,145 | /1970 | Germany | 296/93 |
| 2,038,016 | /1971 | Germany | 52/400 |

Primary Examiner—Frank L. Abbott
Assistant Examiner—Carl D. Friedman
Attorney—Granville M. Brumbaugh et al.

[57] ABSTRACT

An automotive window assembly is constructed by gluing a windowpane to an auxiliary frame at a location remote from the automobile and thereafter attaching the auxiliary frame to a primary frame on the automobile.

5 Claims, 1 Drawing Figure

PATENTED JAN 8 1974
3,783,568
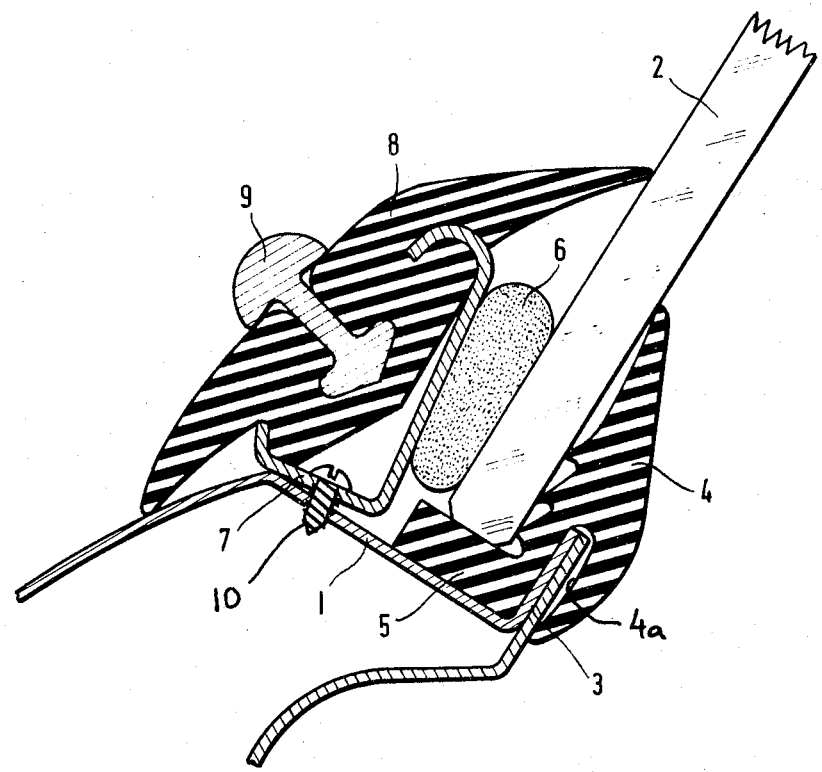
BY
Watson, Cole, Grindle & Watson
ATTORNEYS

AUTOMOTIVE WINDOW ASSEMBLY AND PROCESS

CROSS REFERENCES TO RELATED APPLICATIONS

Applicants claim priority from corresponding German Pat. application Ser. No. P 20 24 753.4, filed May 21, 1970.

BACKGROUND OF THE INVENTION

1. Field of the Invention

This invention relates to an automotive window assembly and to a process for the production of the same using an adhesive.

2. Description of the Prior Art

In view of the increasingly severe constructional standards set by the authorities for motor vehicles with regard to passenger safety in the case of traffic accidents, it is required that increased attention be paid to the installation of windowpanes, particularly windshields, in motor vehicles in order to satisfy government regulations.

Manifestly it is old to glue windowpanes to a window frame. For example, see German Pat. No. 1,195,618 and German published application Nos. 1,271,571 and 1,279,492. As a result of these techniques, not only has there been an increased assurance against movement of the pane from the window opening but, at the same time, an improved seal against entry of water or dust as well as against draft has been provided. In these prior constructions, the windowpane, or the seal receiving it, has always been glued directly to the frame.

For mass assembly, however, these processes are disadvantageous and therefore unsuitable for the following reasons. It is necessary, for functional reasons, that the adhesive bind quickly. Thus, the adhesive becomes effective immediately. Since it is difficult to seat the pane correctly in the window opening at the first try, in many instances small corrections have been necessary, thus necessitating removal of the pane from the frame and reinsertion thereof. In such instances, the prior adhesive prevents proper mounting of the window in the frame and interferes with mass assembly.

SUMMARY OF THE INVENTION

It is, therefore, a primary object of the invention to provide a process for installing a windowpane, especially a windshield, which permits perfect mounting of the window in a frame without having to renounce the advantages of a glue connection. According to the invention, such a process is characterized in that, first, the windowpane is attached to an auxiliary frame by means of an adhesive and thereafter the auxiliary frame with the windowpane attached is attached to the primary frame surrounding the window opening.

This process offers the advantage, as compared to prior art procedures, of relieving the workman who assembles the windowpane in the frame on the assembly line of the difficult job of manipulating the adhesive. The windowpane is glued locally and permanently to the auxiliary frame independently of the installation of the latter into the vehicle. Only after the adhesive has completely set will the auxiliary frame with the windowpane glued thereto be attached in the primary window frame. Thus, corrections in the case of improper assembly are possible without difficulty. Further, unsightly blemishes which have been created in the past when areas in the vicinity of the window opening have been unintentionally contacted with adhesive are completely avoided through the use of the present invention.

BRIEF DESCRIPTION OF THE DRAWING

The single FIGURE is a cross-sectional view of an automotive window assembly which embodies the concepts and principles of the present invention.

DESCRIPTION OF THE PREFERRED EMBODIMENT

In the drawing, the reference numbered 1 designates a primary frame for mounting a windshield in an automobile. Frame 1 surrounds the window opening and is L-shaped in transverse cross-section having a first leg or bridge 3 including a first surface which is approximately parallel to and is disposed in overlapping relationship to windowpane 2. Generally, bridge 3 is disposed to the inside of the vehicle relative to windowpane 2 and substantially resembles traditional designs.

An elastic sealing strip 4 is provided with a groove 4a which receives bridge 3. Strip 4 is generally L-shaped in transverse cross-section and has a portion 5 which extends to the left of bridge 3 as shown in the drawing. Portion 5 serves as a support for the edge of pane 2 as can be seen.

Windowpane 2 is attached by means of adhesive 6 to the first leg or contact surface of a generally L-shaped, in transverse cross-section, auxiliary frame 7 at a location remote from frame 1. Thereafter, frame 7 with windowpane 2 attached thereto is assembled into frame 1, and windowpane 2 is pressed into the window opening against strip 4 on bridge 3. Thus, pane 2 stands obliquely and is supported by portion 5o of strip 4. Then the second leg or mounting flange of auxiliary frame 7 is attached to the second leg or second surface of frame 1 by means of screw 10. Thus, windowpane 2 is positively attached and locked in the window opening. As a final measure, an elastic sealing strip 8, which carries a decorative strip 9, may be snapped onto auxiliary frame 7 as shown. Thus, the details of attachment are concealed from view both on the outside and on the inside of the vehicle.

Manifestly, means other than screws 10 may be utilized for attaching frames 1 and 7 together as is known to those skilled in the art. The mounting of auxiliary frame 7 is made easy because of the fact that frame 1 is provided with bridge 3 which serves as a support for pane 2. Bridge 3 preferably extends around the entirety of frame 1. Bridge 3 serves as a support for pane 2 and facilitates the mounting thereof. Toward this end, the elastic sealing strip 4 is received on bridge 3 to facilitate provision of a proper seal and to provide an appropriate optical impression which enhances the overall sightliness of the installation. Further, sealing strip 4 offers the advantage of an elastic intermediate layer as shock absorber between bridge 3 and windowpane 2. Thus shocks transmitted from the roadway to the body of the car are reduced by the strip 4 and are not transmitted in full force to the pane 2.

Auxiliary frame 7 is constructed in such a way that it may receive and support elastic sealing strip 8. Strip 8 contributes, along with strip 4, to solution of the sealing problem. Further, strip 8 conceals the manner of attachment of windowpane 2 toward the outside. The entirety of auxiliary frame 7, its means of attachment to frame 1, and adhesive means 6 are all covered by a sealing strip 8.

We claim:

1. An automotive window assembly comprising:

a windowpane shaped to match a window area;

a substantially rigid auxiliary frame presenting an opening generally coextensive in size with said window area, said frame having a contact surface for attachment to one side of said windowpane and a mounting flange extending angularly away from said one windowpane side;

adhesive means for attaching said windowpane to said contact surface;

a primary frame havng a first surface generally parallel to said windowpane in said window area and defining a bridge and a second surface extending angularly away from said bridge and surrounding said window area, said mounting flange being positioned for connection to said primary frame second surface with said areas in alignment and said windowpane positioned between said bridge and said contact surface; and means for detachably connecting said mounting flange to said primary frame second surface whereby said windowpane is retained between said bridge and said contact surface.

2. An assembly according to claim 1 further comprising an elastic interior seal received on said bridge and having a portion thereof extending between said windowpane and said primary frame, said windowpane being forced against said seal by the action of said means connecting said auxiliary frame mounting flange to said primary frame second surface.

3. An assembly as set forth in claim 1 wherein:

said auxiliary frame surface and said auxiliary frame mounting flange each have an inturned outer edge forming an elongate channel; and further including an exterior elastic sealing strip mounted integrally on said auxiliary frame, said strip having portions received in said channels of said auxiliary frame and further having an outer surface extending in sealing relation between said windowpane and said primary frame to cover said auxiliary frame, said outer surface of said strip being provided with a groove located between said portions and receiving therein a trim strip.

4. An automotive window assembly comprising:

a windowpane shaped to match a window area;

an auxiliary frame presenting an opening generally coextensive in size with said window area and being generally L-shaped in cross-section and having a first leg forming a contact surface for attachment to the periphery of one side of said windowpane and a second leg defining a mounting flange extending angularly away from said one side;

adhesive means for attaching said windowpane to said contact surface;

a primary frame being generally L-shaped in transverse cross-section and having a first leg generally parallel to said windowpane, said leg extending into said window area and defining a bridge, and a second leg generally perpendicular to said first leg and surrounding said window, said auxiliary frame mounting flange extending angularly away from said one side for connection to said primary frame second leg with said areas in alignment and said windowpane positioned between said bridge and said auxiliary frame first leg; and means for detachably connecting said mounting flange to said primary frame second leg whereby said windowpane is retained between said bridge and said auxiliary frame first leg.

5. An assembly according to claim 4 wherein:

an elastic interior seal is received on said bridge and has a portion thereof extending between said windowpane and said primary frame, said windowpane being forced against said seal by the action of said means connecting said mounting flange to said primary frame second leg;

said auxiliary frame legs each have an inturned outer edge forming an elongate channel; and an exterior elastic sealing strip is mounted integrally on said auxiliary frame, said strip having portions received in said channels and further having an outer surface extending in sealing relation between said windowpane and said primary frame to cover said auxiliary frame, said outer surface of said strip being provided with a groove located between said portions and receiving therein a trim strip.

* * * * *